US006940039B2

(12) United States Patent
Blankenship et al.

(10) Patent No.: US 6,940,039 B2
(45) Date of Patent: Sep. 6, 2005

(54) QUALITY CONTROL MODULE FOR TANDEM ARC WELDING

(75) Inventors: George D. Blankenship, Chardon, OH (US); Dmitry Brant, Richmond Hts., OH (US); Edward D. Hillen, Painesville, OH (US)

(73) Assignee: Lincoln Global, Inc., Monterey Park, CA (US)

( * ) Notice: Subject to any disclaimer, the term of this patent is extended or adjusted under 35 U.S.C. 154(b) by 69 days.

(21) Appl. No.: 10/741,140

(22) Filed: Dec. 22, 2003

(65) Prior Publication Data

US 2005/0133488 A1 Jun. 23, 2005

(51) Int. Cl.[7] ............................................ B23K 9/095
(52) U.S. Cl. ............................................ 219/130.01
(58) Field of Search ...................... 219/130.01, 124.34, 219/130.31, 130.32, 130.33

(56) References Cited

U.S. PATENT DOCUMENTS 3,150,624 A * 9/1964 Brems ................... 219/124.34
4,806,735 A * 2/1989 Ditschun et al. ......... 219/130.5
5,140,140 A 8/1992 Pollack
5,214,265 A 5/1993 Pollack
5,278,390 A 1/1994 Blankenship
6,111,216 A 8/2000 Stava
6,207,929 B1 3/2001 Stava
6,291,798 B1 9/2001 Stava
6,472,634 B1 10/2002 Houston
2003/0071024 A1 4/2003 Hsu

FOREIGN PATENT DOCUMENTS

JP 61-017364 A * 1/1986

* cited by examiner

*Primary Examiner*—Clifford C. Shaw
(74) *Attorney, Agent, or Firm*—Fay, Sharpe, Fagan, Minnich & McKee, LLP

(57) ABSTRACT

A tandem welding system includes a plurality of spaced apart electrodes (12, 14, 16, 18) arranged to travel at a common travel speed. The plurality of spaced apart electrodes (12, 14, 16, 18) cooperatively perform a weld. A data storage medium (74) stores measured data for each electrode during the performing of the weld. A processor (110) performs a process comprising: for each electrode, recalling measured data corresponding to the electrode passing a reference position; and, combining the recalled measured data of the plurality of spaced apart electrodes (12, 14, 16, 18) to compute a weld parameter of the tandem welding system at the reference position.

38 Claims, 6 Drawing Sheets

QUALITY CONTROL MODULE FOR TANDEM ARC WELDING

The following relates to the art of electric arc welding and more particularly to an electric arc welding system employing tandem electrodes, an electrode having tandem electrode wires, or the like.

INCORPORATION BY REFERENCE

This disclosure relates to an electric arc welding system utilizing power supplies for driving two or more tandem electrodes. Such a system is used, for example, in seam welding of large metal blanks. While substantially any arc welding power supply can be used, the power supplies disclosed in Stava 6,111,216 are suitably used in one embodiment. Stava 6,111,216 is incorporated herein by reference.

The concept of arc welding using tandem electrodes is disclosed, for example, in Stava et al. 6,207,929, in Stava 6,291,798, and in Houston et al. 6,472,634. Patents 6,207,929, 6,291,798, and 6,472,634 are also incorporated herein by reference.

The determination of heat input values in the case of a waveform-controlled welding embodiment is disclosed at least in Hsu, U.S. published application 2003-0071024 A1. U.S. published application 2003-0071024 A1 is also incorporated herein by reference.

BACKGROUND

Welding applications, such as pipe welding, often require high currents and use several arcs created by tandem electrodes. Such tandem welding systems are described, for example, in Stava 6,207,929 and Stava 6,291,798. Houston 6,472,634 discloses the concept of a single AC arc welding cell for each electrode wherein the cell itself includes one or more paralleled power supplies each of which has its own switching network. The output of the switching network is then combined to drive the electrode. The power supplies can be paralleled to build a high current input to each of several electrodes used in a tandem welding operation.

Stava 6,291,798 discloses a series of tandem electrodes movable along a welding path to lay successive welding beads in the space between the edges of a rolled pipe or the ends of two adjacent pipe sections. The individual AC waveforms are suitably created by a number of current pulses occurring at a frequency of at least 18 kHz with a magnitude of each current pulse controlled by a wave shaper. This technology dates back to Blankenship 5,278,390. In Stava 6,207,929, the frequency of the AC current at adjacent tandem electrodes is adjusted to prevent magnetic interference.

Computation of the heat input in the case of waveform controlled welding is complicated by the complex shape of the voltage and current waveforms. A product of the rms current times the rms voltage provides a measure of the heat input, but such a computation does not take into account the precise shape of the waveform and possible phase offsets between the voltage and current. A generally more accurate method for computing heat input in waveform controlled welding is described in Hsu, U.S. published application 2003-0071024 A1.

One difficulty with tandem welding is characterizing and monitoring the quality of the tandem weld. Analysis of tandem arc welding is complicated due to the use of multiple electrode wires for depositing metal simultaneously but at spatially separated positions. The electrode wires of the tandem electrodes may have different wire diameters. The wire feed speed of each electrode may be independently dynamically adjusted for each electrode to control the arc length or other welding characteristics. In some tandem arc welding applications, a combination of electrodes operating using d.c. current and a.c. current may be employed, for example to reduce interference between the electrodes. Still further, the voltage and/or current of each electrode may be independently controlled.

At a given location of the weld, each electrode in general contributes weld bead material at different times during the weld process. The metal deposition rate, heat input, and other welding parameters for that location depend upon the combined effect of the several electrodes of the tandem arrangement, but the contributions of the several electrodes are separated in time.

The present invention contemplates an improved apparatus and method that overcomes the above-mentioned limitations and others.

SUMMARY

According to one aspect, a method is provided for monitoring a tandem welding process employing a plurality of tandem electrodes. A welding parameter is measured for each tandem electrode. The measured welding parameters are shifted to a reference. The measured and shifted welding parameters of the tandem electrodes are combined at the reference.

According to another aspect, a tandem welding system is disclosed. A plurality of spaced apart electrodes are arranged to travel at a common travel speed. The plurality of spaced apart electrodes cooperatively perform a weld. A data storage medium stores measured data for each electrode during the performing of the weld. A processor performs a process comprising: for each electrode, recalling measured data corresponding to the electrode passing a reference position; and combining the recalled measured data of the plurality of spaced apart electrodes to compute a weld parameter of the tandem welding system at the reference position.

According to yet another aspect, a tandem welding method is provided. A tandem welding process is performed using a plurality of electrodes arranged at fixed relative positions to one another and cooperatively forming a weld. A welding parameter of each of the plurality of electrodes is measured during the welding process. Welding parameter values for each electrode corresponding to the electrode welding at a selected position are determined. A tandem welding parameter of the tandem welding process is computed at the selected position based on the determined welding parameter values of the plurality of electrodes.

Numerous advantages and benefits of the present invention will become apparent to those of ordinary skill in the art upon reading the following detailed description of the preferred embodiment.

BRIEF DESCRIPTION OF THE DRAWINGS

The invention may take form in various components and arrangements of components, and in various process operations and arrangements of process operations. The drawings are only for the purpose of illustrating preferred embodiments and are not to be construed as limiting the invention.

DETAILED DESCRIPTION OF THE PREFERRED EMBODIMENTS

Figure 1:
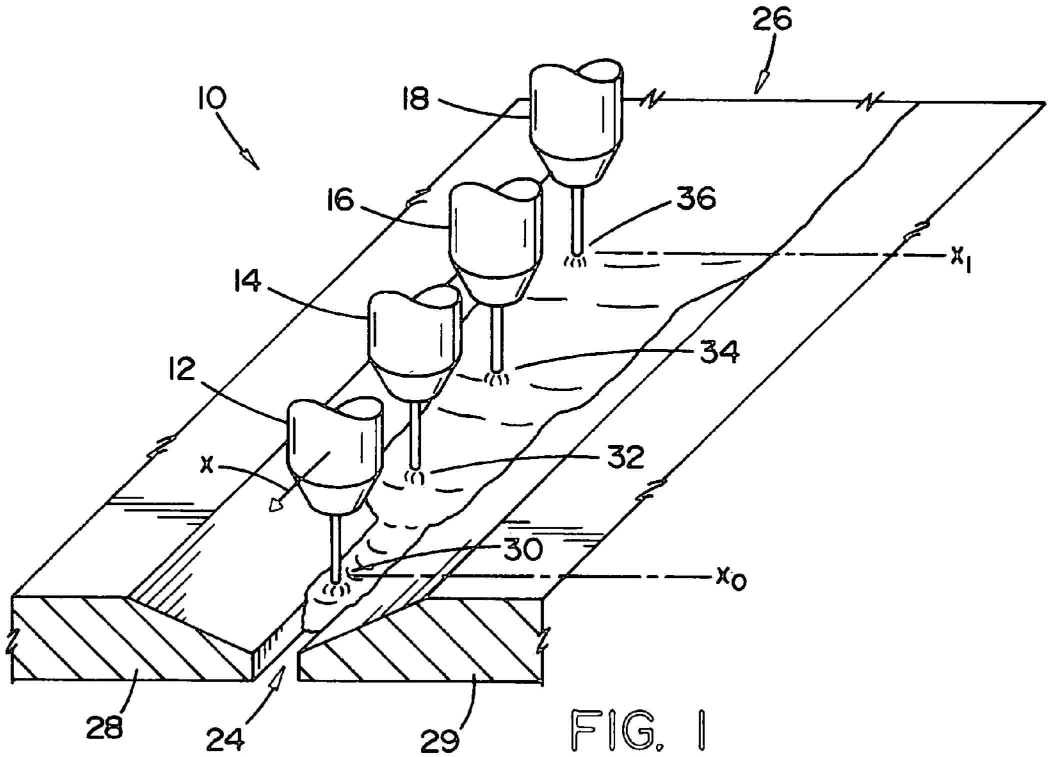
FIGS. 1 and 2 shows perspective and side views, respectively, illustrating a tandem arc welding process using four electrodes.

With reference to FIG. 1, an electric arc welding process 10 employs tandem welding electrodes including in the illustrated embodiment four welding electrodes 12, 14, 16, 18. While four electrodes are illustrated, other numbers of electrodes can be used in tandem. The tandem electrodes 12, 14, 16, 18 are arranged linearly and spaced apart along a direction designated the x-direction in FIGS. 1 and 2, and move together along the x-direction at a selected travel speed. In one embodiment, the electrodes 12, 14, 16, 18 are mounted to a common flange of a welding robot (not shown) so that the electrodes 12, 14, 16, 18 move along the designated x-direction at a common travel speed. Each of the tandem electrodes 12, 14, 16, 18 deposits weld material at a weld joint 24 of a workpiece 26 defined by two edges, components, or so forth 26, 28 that are to be joined together by welding.

Figure 2:
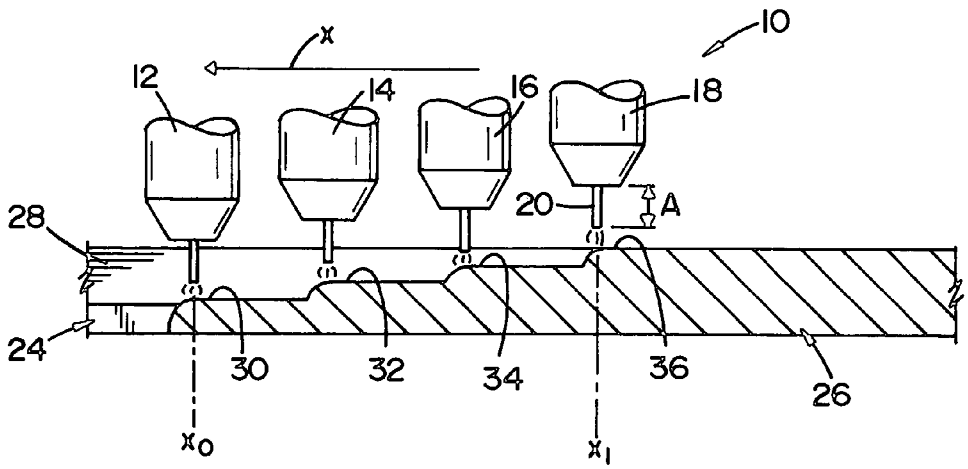

In the embodiment illustrated in FIGS. 1 and 2, the electrodes 12, 14, 16, 18 are spaced apart from one another with an approximately equal spacing between each pair of nearest-neighboring electrodes. However, in other embodiments the spacing of nearest-neighboring electrodes is not the same for each pair of nearest-neighboring electrodes.

As illustrated in FIG. 1, the joint 24 includes a gap that is to be filled with weld material. As the tandem electrodes move, the electrode 14 adds additional weld material to weld material previously deposited by the electrode 12. The electrode 16 adds additional weld material to weld material previously deposited by the electrodes 12, 14. The electrode 18 adds additional weld material to weld material previously deposited by the electrode 12, 14, 16.

Each electrode has a stick-out of length "A" (indicated in FIG. 2 for the electrode 20) corresponding to a length of electrode wire sticking out of the electrode toward the weld. As best seen in FIG. 2, the electrodes 12, 14, 16, 18 are staggered in height respective to the weld joint 24 so that the electrode 12 deposits deeper into the weld joint 24 than the electrode 14, the electrode 14 deposits deeper into the weld joint 24 than the electrode 16, and the electrode 16 deposits deeper into the weld joint 24 than the electrode 18. This arrangement facilitates each electrode depositing a weld bead substantially on top of the weld bead deposited by the earlier-passing electrode or electrodes. In another approach, the stickout of the electrodes can be shortened such that each electrode deposits weld material substantially on top of the weld material deposited by the earlier-passing electrode or electrodes.

FIGS. 1 and 2 show the tandem welding process 10 at a fixed point in time. At the illustrated time, the electrode 12 is passing a location 30 of the weld joint 24. The electrodes 14, 16, 18 have not yet passed over the location 30; hence, only a relatively small weld bead deposited by the electrode 12 is disposed at the location 30. At the illustrated time, the electrode 14 is passing a location 32 of the weld joint 24. The electrode 12 has already passed the location 32 and deposited a first weld bead, which the electrode 14 adds additional material to. The electrodes 16, 18 have not yet passed over the location 32. Because both electrodes 12, 14 have deposited at the location 32, a larger amount of material is disposed at the location 32 compared with at the location 30.

Similarly, at the illustrated time, the electrode 16 is passing a location 34 of the weld joint 24. The electrodes 12, 14 have already passed the location 34 and deposited weld beads, which the electrode 16 adds to. The electrode 18 has not yet passed over the location 34. Because both electrodes 12, 14, 16 have deposited at the location 34, more weld material is disposed at the location 32 compared with the locations 30, 32. Finally, at the illustrated time, the electrode 18 is passing a location 36 of the weld joint 24. The electrodes 12, 14, 16 have already passed the location 36 and deposited weld material thereat, which the electrode 18 adds to. All four electrodes 12, 14, 16, 18 have deposited weld beads at the location 36 to form a composite weld bead at the location 36.

The illustrated tandem welding process 10 is an example process. In other embodiments, a tandem torch is used for tandem welding. The tandem torch includes a plurality of electrode wires, optionally with each having an independently controllable voltage, current, wire feed speed, and stickout. In the embodiment shown in FIGS. 1 and 2, it will be appreciated that each electrode 12, 14, 16, 18 can operate substantially differently, such as using different voltages, different currents, different waveforms, and so forth. Different electrodes of the tandem combination can use axial spray transfer, pulsed spray transfer, a.c. or d.c. welding, waveform controlled welding, or so forth. Selection and operation of the electrode 12 is preferably optimized to produce a narrow weld bead having good penetration, while selection and operation of the electrode 18 is preferably optimized to produce a broader weld bead that fills in the wider portion of the weld joint 24. The electrodes 14, 16 preferably have characteristics intermediate between those of electrodes 12, 18.

Figure 3:
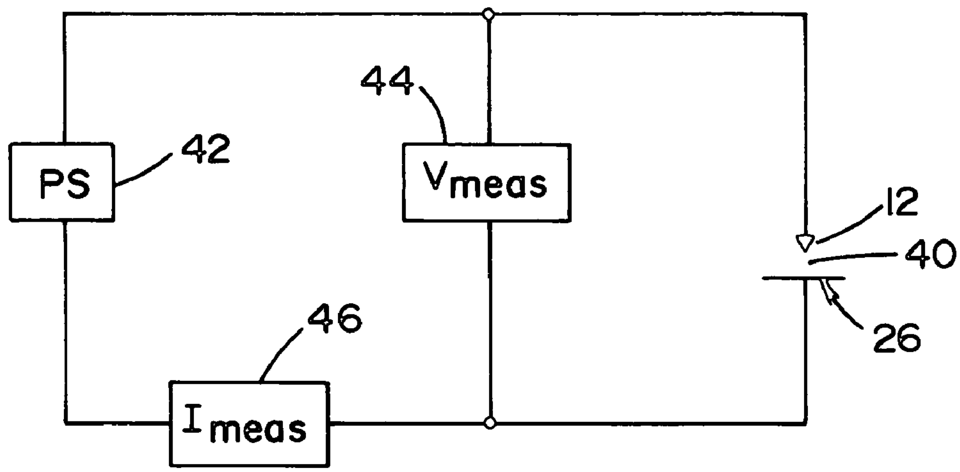
FIG. 3 diagrammatically shows a simplified equivalent circuit of one of the electrodes, including suitable components for measuring weld current and weld voltage, or parameters corresponding thereto.

With reference to FIG. 3, a simplified electronic equivalent circuit of the lead electrode 12 is shown. The electrode 12 is separated from the workpiece 26 by a gap 40. A voltage across the gap 40 and an arc current flowing across the gap 40 are generated by a welding power supply 42. A voltage measuring device 44, such as a voltmeter, measures a voltage corresponding to the voltage across the gap 40. Depending upon where the voltage measurement is performed, the measured voltage may include contributions besides the gap voltage, such as a resistive voltage drop contribution due to current flowing through the electrode wire or the workpiece. A current measuring device 46, such as a current shunt, an ammeter, or the like, measures the current flowing across the gap 40.

FIG. 3 illustrates the simplified electronic equivalent circuit of the lead electrode 12. However, it is understood that each of the other electrodes 14, 16, 18 also preferably include voltage and current measuring devices for measuring arc voltage and current, or parameters relating thereto. Each electrode is driven by a separate welding power supply, by a parallel combination of welding power supplies, by a single welding power supply with multiple outputs for driving the plurality of electrodes 12, 14, 16, 18, or by some combination thereof. Some electrodes may be driven by an a.c. welding power supply while others are driven by a d.c. welding power supply. Moreover, the applied power may be phased or otherwise synchronized to reduce interactions between the arcs of the electrodes 12, 14, 16, 18.

A weld heat input for each electrode 12, 14, 16, 18 is defined by the product of the arc voltage and arc current divided by the travel speed in units of power per unit length of travel. For a.c. welding, the weld heat input is suitably computed using a product of rms current time rms voltage, optionally corrected for a power factor related to phase offset between the current and voltage. In the case of waveform controlled welding, the weld heat input is suitably computed using an integral of the current-voltage product as described in U.S. published application 2003-0071024 A1. It is to be appreciated, however, that the weld heat input may be estimated or approximated, for example by neglecting the power factor term in a.c. welding, or by multiplying rms current times rms voltage in the case of waveform controlled welding.

Figure 4:
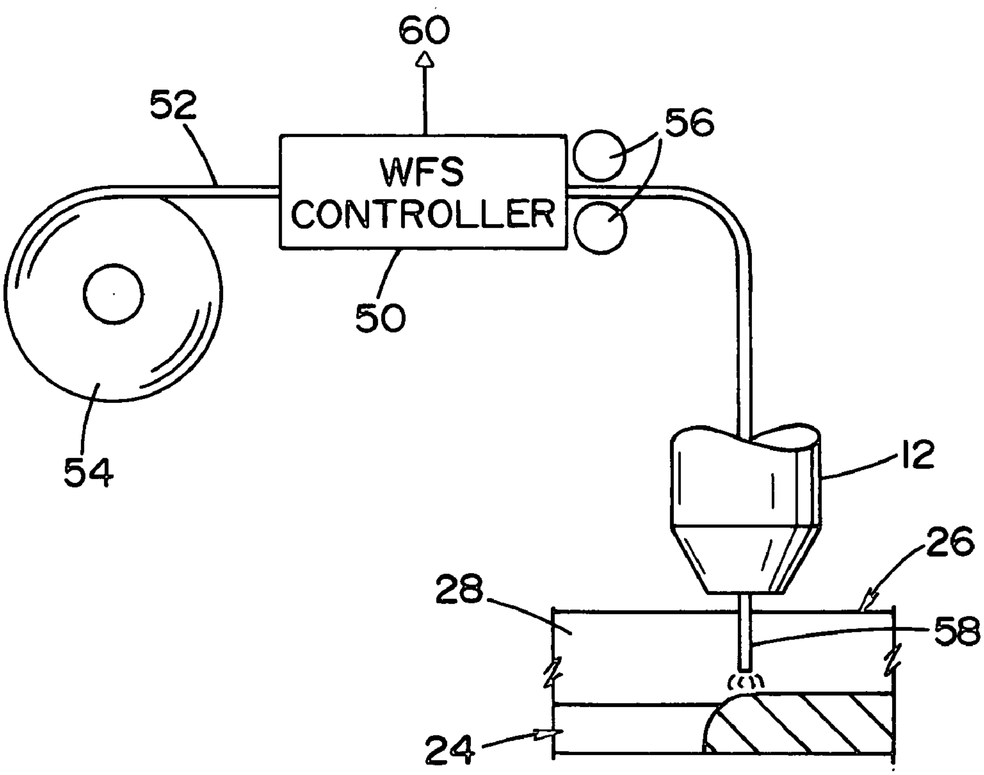
FIG. 4 diagrammatically shows a wire feed system for one of the electrodes, including a wire feed speed controller that feeds electrode wire to the weld at a controlled wire feed speed.

With reference to FIG. 4, a diagrammatic illustration of an electrode wire feed mechanism for the lead electrode 12 is shown. A wire feed speed (WFS) controller 50 draws electrode wire 52 from an electrode wire spool 54 and feeds the drawn electrode wire through suitable wire conveyance structures such as rollers 56 to the electrode 12. A tip or stick-out 58 of the drawn electrode wire 52 sticks out of the electrode 12 and the arc transfers material from the electrode wire 52 to the workpiece 26. The electrode wire 52 is consumed in this process, and is replaced by the wire feeding. A WFS output 60 of the WFS controller 50 corresponds to the WFS, which may change over time to control the arc length, sick-out 58, or other welding parameter. The WFS output 60 can be an analog voltage proportional to the WFS, a digital value proportional to the WFS or the like.

FIG. 4 diagrammatically illustrates the electrode wire feed mechanism for the lead electrode 12. However, it is understood that each of the other electrodes 14, 16, 18 also include electrode wire feed mechanisms for feeding wire to the weld at a selected WFS. For each electrode, a deposition rate is suitably defined as a product of the cross-sectional area of the electrode wire 52 times the WFS times a density of the electrode wire.

Figure 5:
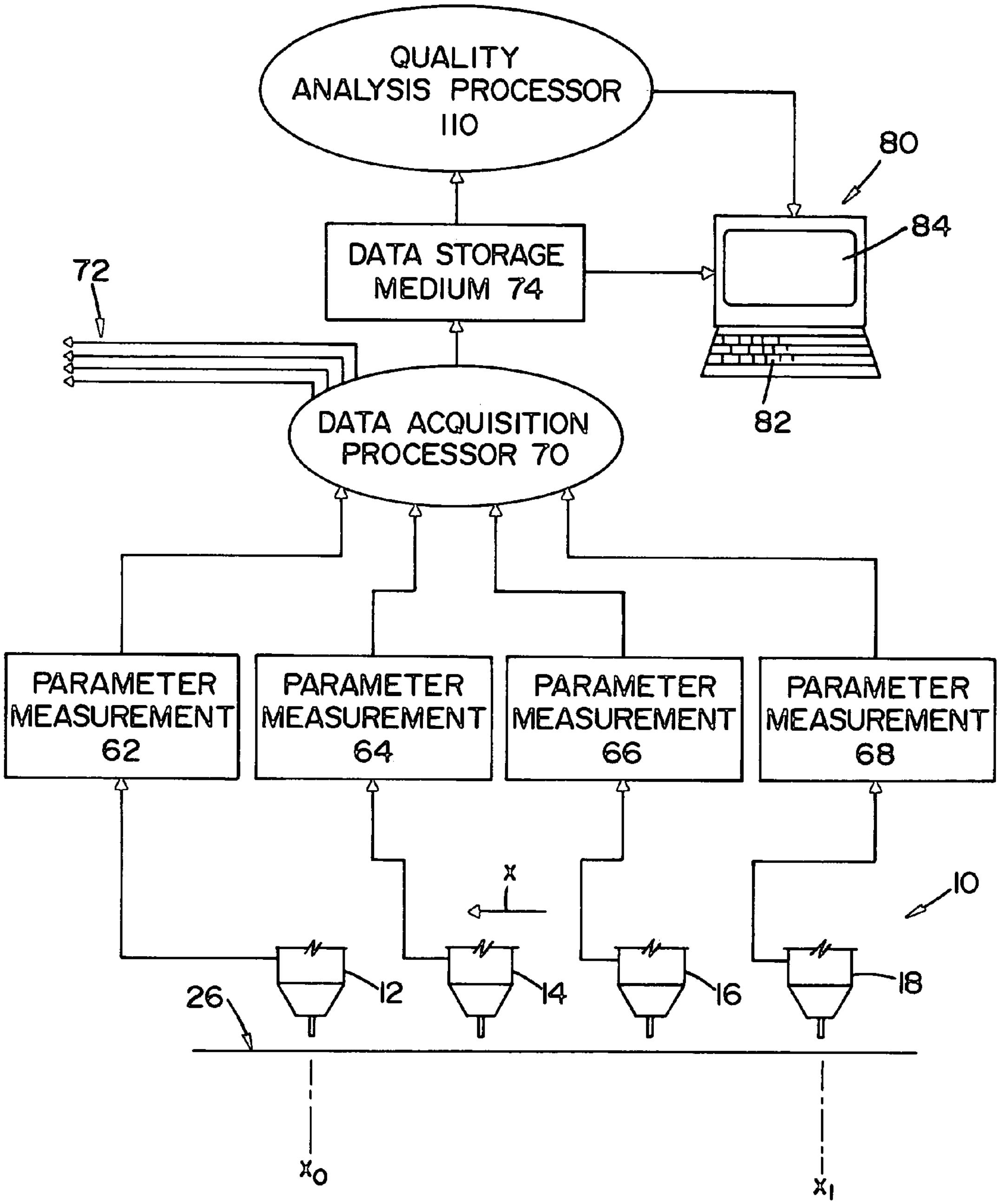
FIG. 5 diagrammatically shows a monitoring system for monitoring the tandem arc welding process.

With reference to FIG. 5, a method for monitoring the tandem welding process 10 is described. Each of the electrodes 12, 14, 16, 18 is monitored by one or more corresponding parameter measurement devices 62, 64, 66, 68. For example, the one or more measurement devices 62 monitoring the electrode 12 can include the voltage and current measuring devices 44, 46 of FIG. 3 and the WFS output 60 of the WFS controller 50 of FIG. 4.

A data acquisition processor 70 receives measurement data from the parameter measurement devices 62, 64, 66, 68. The measured welding parameter data are optionally used by the processor 70 to generate one or more feedback signals 72 for controlling the welding process 10. For example, in a constant current welding process, the feedback signals 72 suitably include the measured arc currents of the electrodes 12, 14, 16, 18. The welding process 10 adjusts parameters such as the WFS or the arc voltage of each electrode to keep the feedback arc currents 72 substantially constant. In some embodiments, the WFS or arc voltage is similarly controlled for each electrode to control the arc length or other welding characteristics.

The measured welding parameter data are also stored in a data storage medium 74, which can be a substantially permanent, non-volatile memory such as a magnetic disk, or a transient, volatile memory such as random access memory (RAM), or some combination thereof. Optionally, the data acquisition processor 70 performs one or more computations or transformations of the measured data and stores the transformed measured welding parameter data.

In one embodiment, the parameter measurement devices 62, 64, 66, 68 output digital data measured at selected intervals (for example, one set of measurements every 100 milliseconds) and the stored data is digital data corresponding to discrete time values. In another embodiment, the parameter measurement devices 62, 64, 66, 68 perform analog measurements, and the data acquisition processor 70 includes analog-to-digital conversion circuitry that digitizes the measured data and stores digitized welding parameter measurements in the data storage medium 74.

The stored measured welding parameters can be accessed by a human user or operator via a user interface 80. The user interface includes on or more user inputs, such as an illustrated keyboard 82, a pointing device such as a mouse or trackball, or the like. The user interface also includes a display or monitor 84, which preferably has the capability of producing a graphical display, although a text-only display is also contemplated.

Figure 6:
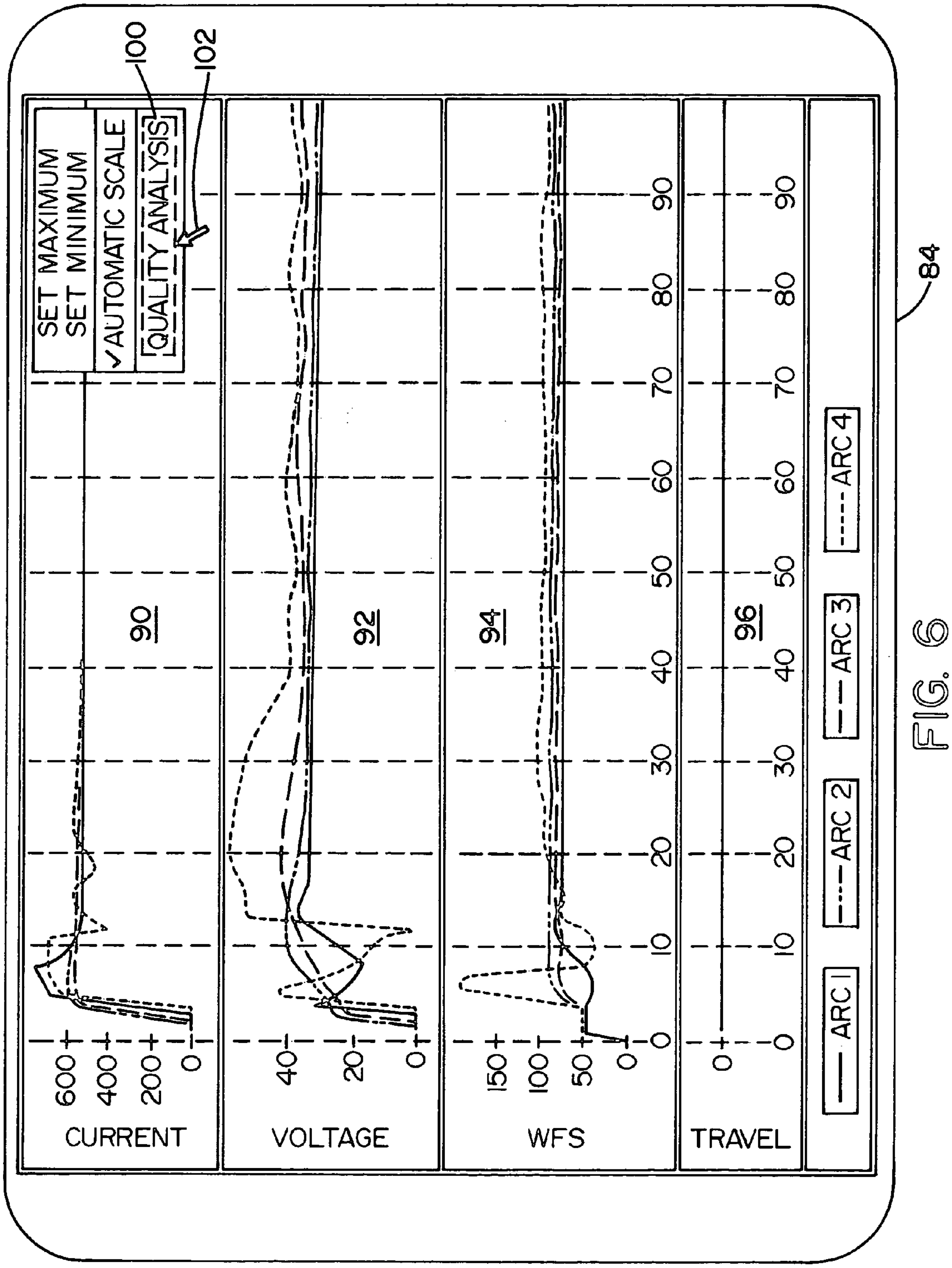
FIG. 6 shows a display plotting weld current, voltage, and wire feed speed for each electrode as a function of position.

With reference to FIG. 6, a suitable display or window on the monitor 84 shows an arc current welding parameter plot 90, an arc voltage welding parameter 92, and a WFS welding parameter 94. In each plot 90, 92, 94 the welding parameter data for each of the four electrodes 12, 14, 16, 18 are plotted using a different type of solid, dashed, or dotted line. In the display of FIG. 6, the four electrodes 12, 14, 16, 18 are identified as “ARC 1”, “ARC 2”, “ARC 3”, and “ARC 4”, respectively. The welding parameter data of the plots 90, 92, 94 are plotted against an abscissa 96 indicative of the travel position of the four ganged electrodes 12, 14, 16, 18.

The display or window of FIG. 6 is useful for certain diagnostic applications such as identifying a failed electrode. However, the data of each electrode alone is not indicative of the overall weld. For instance, as noted in reference to FIGS. 1 and 2, at the position 36 a completed composite weld bead includes weld bead contributions from all four electrodes 12, 14, 16, 18. Hence, the user or operator has the option of selecting a quality analysis selector 100, using for example a mouse pointer 102 operated by a mouse, trackball, or other pointing device. In another approach, a keyboard selection can be used to select quality analysis.

With reference returning to FIG. 5, selection of the quality analysis selector 100 causes a quality analysis processor 110 to perform one or more analyses of the overall tandem welding process. The quality analysis processor reads the data storage medium 74 to obtain selected welding parameter data for each of the four electrodes 12, 14, 16, 18, and computes a combined tandem welding parameter based thereon. The computed tandem welding parameter is shown in a display or window on the monitor 84.

The combined tandem welding parameter may be of the same or different type from the welding parameter data for each of the four electrodes 12, 14, 16, 18. For example, the welding parameter data for each of the four electrodes 12,

14, 16, 18 may be weld current, and the combined tandem welding parameter may be total weld current computed by summing the weld currents of the four electrodes 12, 14, 16, 18. Alternatively, the welding parameter data for each of the four electrodes 12, 14, 16, 18 may be weld voltage and weld current, and the combined tandem welding parameter may be total weld heat input.

With continuing reference to FIG. 5 and with returning reference to FIGS. 1 and 2, before combining measured weld parameter data from the electrodes 12, 14, 16, 18, the weld parameter data is shifted to a common reference. For example, a suitable common reference is the position of the lead electrode 12, which is designated as $x_o$, in FIGS. 1, 2, and 5. The position $x_0$ designates the position of the lead electrode in the x-direction along the weld joint 24.

It is to be appreciated that the position $x_0$ generally changes as a function of time due to travel of the ganged tandem electrodes 12, 14, 16, 18. For example, if the tandem welding process 10 initiates at a time t=0 with the lead electrode 12 at a position x=0, then the position $x_0$ at a later time t is suitably obtained by multiplying the time t by the travel speed. In another embodiment, the position $x_0$ is determined with reference to a travel position of the ganged plurality of electrodes 12, 14, 16, 18. This travel position can be monitored, for example, by sensors on the welding robot.

The position of the other electrodes, such as the position of the trailing electrode 18 designated as $x_l$, at any given time t is given by $x_o+\Delta x$ where $\Delta x$ is a signed separation or spacing between the lead electrode 12 (or other reference electrode or reference position) and the other electrode.

In one embodiment, the data acquisition processor 70 performs a measured data transformation that transforms the measured welding parameter data as a function of time for each electrode 12, 14, 16, 18 into measured welding parameter data as a function of position. Data for the lead electrode 12 are suitably transformed into a function of position according to $x_o=St$ where S is the travel speed and t is the data acquisition time for each measured welding parameter datum. Data for the electrode 18 are suitably transformed into a function of position using $x_l=x_o+\Delta x$. Data for the other electrodes 14, 16 are similarly transformed using appropriate spacings or separations of the electrodes 14, 16 from the lead electrode 12.

In another embodiment, the data acquisition processor 70 stores the measured welding data as a function of time, and the quality analysis processor 110 performs the conversion from time domain to position along the x-direction of travel using the above-discussed formulas.

Once data is converted to a function of position along the x-direction of travel, the tandem welding parameter is suitably computed by combining the welding parameter values of the plurality of electrodes 12, 14, 16, 18 at a given position. It will be appreciated that the combined data is temporally spaced apart in accordance with the described reference shifting.

In another embodiment, the data acquisition processor 70 stores the measured welding data as a function of time, and the quality analysis processor 110 computes the tandem welding parameter as a function of time as well. In this embodiment and designating the lead electrode 12 as the reference electrode, a datum value for lead electrode 12 acquired at a time $t_o$ is combined with datum values for other electrodes acquired at times $t_o+\Delta x/S$, where $\Delta x$ is a signed separation or spacing between the lead electrode 12 and the other electrode and S is the travel speed.

In one embodiment, the computed tandem welding parameters include deposition rate and weld heat input. The deposition rate for the tandem welding process 10 is suitably computed by adding together the deposition rates of the plurality of electrodes 12, 14, 16, 18 at a given position, for example at the lead electrode reference position $x_o$. In order to compute the tandem welding deposition rate at $x_o$, the computation is suitably delayed by a time corresponding to the spatial separation $\Delta x$ between the lead electrode 12 and the last trailing electrode 18 divided by the travel speed, so that when the tandem welding deposition rate at $x_o$ is computed all four electrodes 12, 14, 16, 18 have performed deposition at the position $x_o$. Alternatively, the tandem deposition rate can be calculated using the position $x_l$ of the trailing electrode 18 as the reference position, thus ensuring that all four electrodes 12, 14, 16, 18 have performed deposition at the reference position when the tandem welding parameter is computed.

Still further, while it is generally convenient to use the position of one of the plurality of electrodes as the reference, it is contemplated to have the reference arranged at some position other than the positions of the various electrodes. For example, a position lying midway between the electrodes 14, 16 can be selected as the reference. Such a reference has the advantage of corresponding to a midpoint of the tandem electrodes.

Similarly, the weld heat input for the tandem welding process 10 is suitably computed by adding together the weld heat inputs of the plurality of electrodes 12, 14, 16, 18 at the given position.

Figure 7:
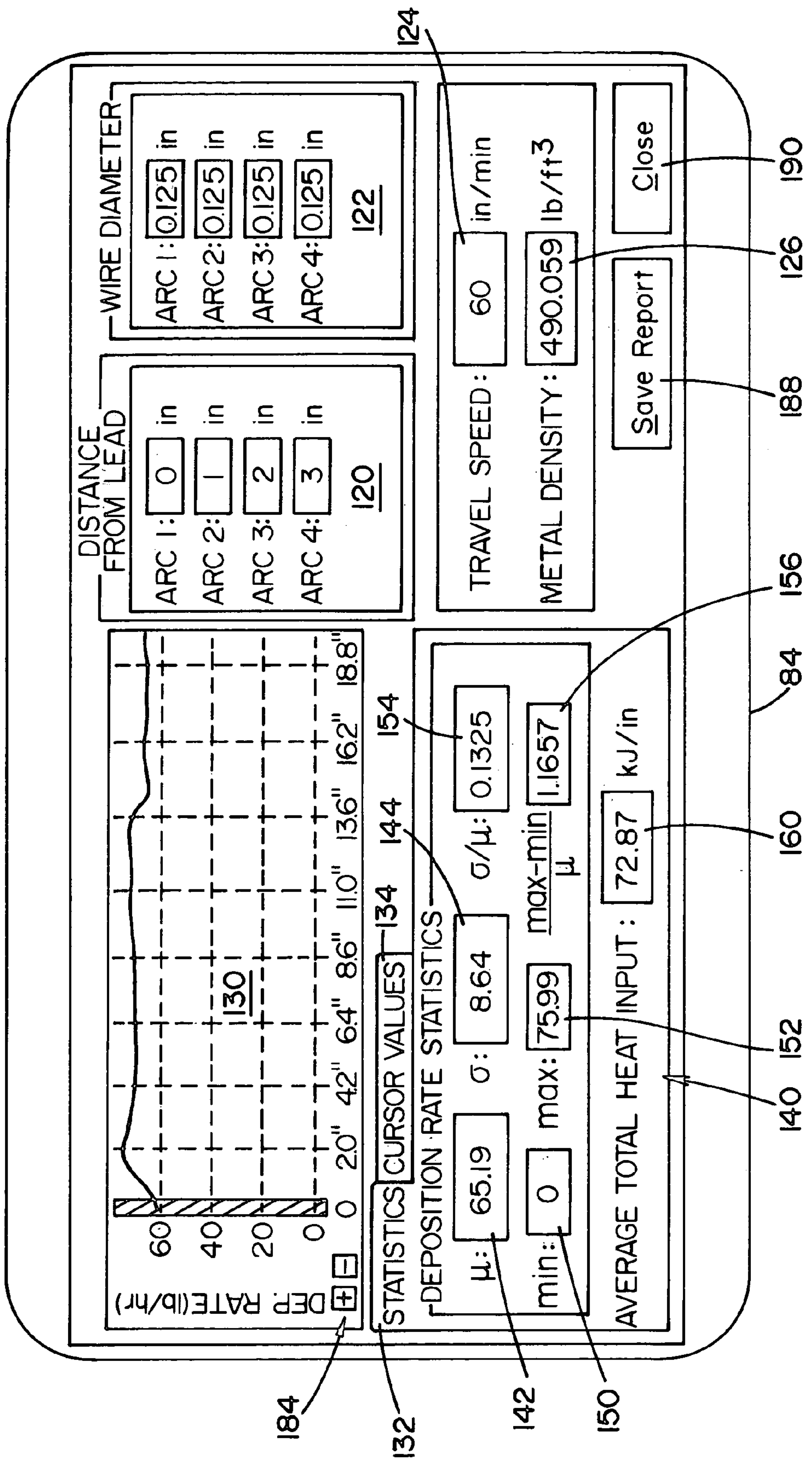
FIG. 7 shows a quality analysis display that displays total deposition rate of the tandem welding electrodes as a function of position as well as statistical information on the total deposition rate of the tandem welding electrodes.

With reference to FIG. 7, a suitable display or window shown on the monitor 84 for providing quality analysis is shown. In addition to measured parameters such as measured voltage, current, and WFS for each electrode, certain additional inputs provided by the user or operator are employed in performing the tandem welding computations. The electrode separations $\Delta x$ for each electrode from the lead electrode 12 are input in a set of inputs 120 titled "Distance from Lead".

In the example inputs shown in FIG. 7, "ARC 1" which corresponds to the lead electrode 12 has $\Delta x=0$, indicating that electrode 12 is designated as the reference electrode. "ARC 2", "ARC 3", and "ARC 4", which correspond to the electrodes 14, 16, 18, respectively, have separations $\Delta x$ from the lead electrode 12 of 1-inch, 2-inch, and 3-inch, respectively. These values correspond to a uniform nearest-neighbor electrodes spacing of 1-inch for each pair of nearest-neighboring electrodes of the four electrodes of the tandem arrangement. It will be appreciated, however, that non-uniform nearest-neighbor electrode spacings can also be used. Moreover, in some embodiments another electrode can be designated as the reference electrode by inputting suitable values into the "Distance from Lead" set of inputs 120. For example, for the uniform 1-inch nearest-neighbor electrodes spacing, inputting values of "ARC 1"=−3-inch, "ARC 2"=−2-inch, "ARC 3"=−1-inch, "ARC 4"=0-inch, would set up the trailing electrode 18 as the reference electrode.

The user inputs also include a set of wire diameter inputs 122 for the electrode wires of the electrodes. In the example inputs shown in FIG. 7, all four electrodes 12, 14, 16, 18 are using wire having ⅛-inch (0.125-inch) diameter. It will be appreciated, however, that the electrodes may use wires of different diameters. The diameter input is used to compute the cross-sectional area of the wire according to area $A=\pi(d/2)^2$ where A is the area and d is the wire diameter. It is also contemplated to use electrode wires having non-circular cross-sections, in which case suitable geometric area formulae and suitable user inputs are provided to compute the cross-sectional area. In another embodiment, the set of wire diameter inputs 122 can be replaced by a set of wire cross-sectional area inputs, thus obviating the wire cross-sectional area computation.

The user inputs further include a travel speed input 124 into which the user inputs the common travel speed of the ganged tandem electrodes 12, 14, 16, 18, and a metal density input 126 into which the user inputs the electrode wire density. Although a single metal density input 126 is provided in the display of FIG. 7, it is also contemplated to employ a separate metal density input for each electrode to accommodate the possible use of electrode wires of different materials in different electrodes. The metal density in the example window, 490.059 lb/ft$^3$, is suitable for steel. The travel speed in the example window of FIG. 7 is 60 inches/min.

The set of wire diameter inputs 122, the metal density input 126, and the measured WFS for each electrode are used to compute the deposition rate for each wire according to:

$$R = \sum_i \pi\left(\frac{d_i}{2}\right)^2 \times \rho_{metal} \times (WFS)_i, \quad (1)$$

where R is the deposition rate, i indexes the electrodes (i=1 . . . 4 for the tandem welding process 10), $d_i$ is the wire diameter of ith electrode, $\rho_{metal}$ is the density of the electrode wire (for example, 490 lb/ft$^3$ for steel), and $(WFS)_i$ is the wire feed speed of the ith electrode. The measured parameter $(WFS)_i$ for each electrode is suitably shifted to the reference time or position based on the travel speed and on the distance of the electrode from the lead electrode or other reference electrode, as described previously for computing tandem welding parameters.

The tandem welding heat input is suitably computed from the measured welding current and voltage parameters of the electrodes along with the travel speed as:

$$H = \frac{\sum_i V_i \times I_i}{S}, \quad (2)$$

where H is the tandem welding heat input, i indexes the electrodes (i=1 . . . 4 for the tandem welding process 10), $V_i$ and $I_i$ are the measured voltage and current respectively, and S is the travel speed (60 inches/min in the example of FIG. 7). Equation (2) is appropriate for d.c. welding, and may provide a reasonable approximation for a.c. and waveform controlled welding when $V_i$ and $I_i$ correspond to root-mean-square (rms) voltage and current, respectively. Optionally, the heat input term computed as the product $V_i \times I_i$ in Equation (2) can be modified to include additional terms such as a power factor term for a.c. welding. For waveform controlled welding, the product $V_i \times I_i$ may be replaced by instantaneous sampled voltage times instantaneous sampled current integrated over one or more waveforms, as described in U.S. published application 2003-0071024 A1. In any of these embodiments, the measured current and voltage for each electrode is suitably shifted to the reference time or position based on the travel speed and on the distance of the electrode from the lead or other reference electrode as described previously for computing tandem welding parameters.

With continuing reference to FIG. 7, in a deposition rate graph 130, the deposition rate of the tandem welding process is plotted as a function of lead electrode position or other reference position. The deposition rate graph 130 is suitably constructed by repeating the computation of the deposition rate of the tandem welding process in accordance with Equation (1) for a plurality of successive lead electrode positions $x_0$ as the welding process 10 progresses in the x-direction along the weld joint 24. The tandem welding deposition rate may vary somewhat over time (or equivalently, over lead electrode position $x_o$) as illustrated in the example deposition rate graph 130. For example, the WFS for each electrode 12, 14, 16, 18 may be controlled and dynamically adjusted to maintain a selected arc length, and these adjustments in WFS produce corresponding changes in the deposition rate in accordance with Equation (1).

With continuing reference to FIGS. 5 and 7, the quality analysis processor 110 preferably provides various user-selectable analysis tools. For example, the user can select between a "Statistics" tab 132 and a "Cursor values" tab 134. The "Statistics" tab 132 brings up a set of statistical analysis values 140 shown in FIG. 7, which include an average or mean deposition rate 142 and a variance, standard deviation, 144, or other measure of the "spread" of the deposition rate over time or equivalently over weld position. The statistical values also include a minimum deposition rate 150 and a maximum deposition rate 152 over the statistically analyzed range. Other statistical quantities such as a ratio 154 of the average or mean deposition rate to the standard deviation and a ratio 156 of the deposition rate spread (that is, the difference between the maximum deposition rate 152 and the minimum deposition rate 150) to the average or mean deposition rate can also be provided.

Moreover, an average heat input 160 is provided. The average heat input 160 is an average over the statistically analyzed range of the tandem heat input parameter computed, for example, using Equation (2).

Figure 8:
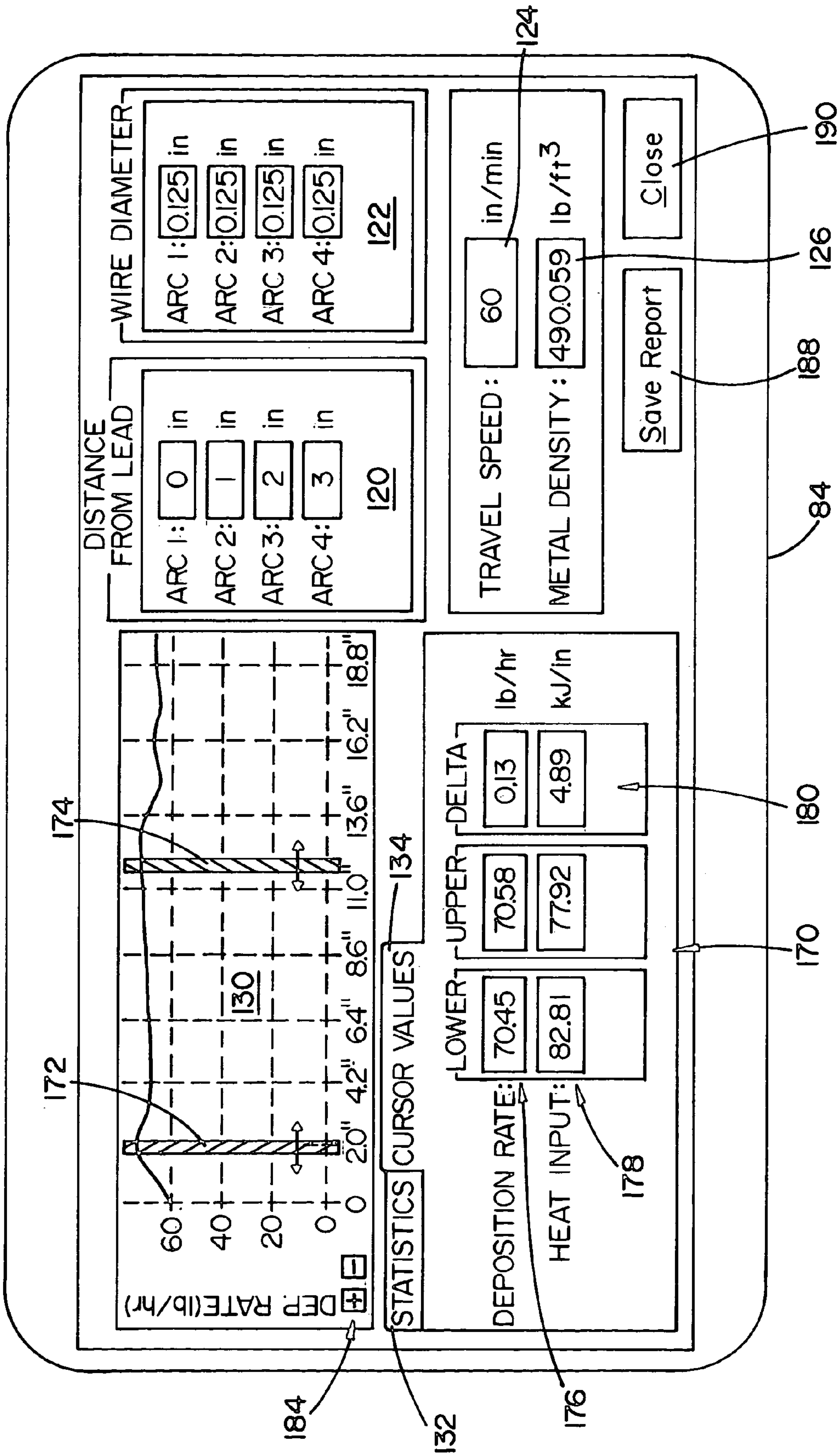
FIG. 8 shows a quality analysis display that displays total deposition rate of the tandem welding electrodes as a function of position as well as user-operable cursors for identifying total deposition rate at selected positions and differences between total deposition rates at different positions.

With continuing reference to FIGS. 5 and 7 and with further reference to FIG. 8, user selection of the "Cursor values" tab 134 replaces the set of statistical analysis values 140 shown in FIG. 7 with a set of cursor values 170 shown in FIG. 8. The set of cursor values 170 identify tandem welding parameter values for welding at positions of lower and upper cursors 172, 174. In the display illustrated in FIG. 8, the tandem welding parameter values include tandem deposition rate 176 and tandem heat input 178. The display also shows the difference values 180 between the welding parameter values at the upper and lower cursors 172, 174. The user can move the cursors 172, 174 using a mouse pointer, keyboard arrow keys, or another suitable user input tool, and the set of cursor values 170 is updated to reflect the new cursor position or positions.

In one embodiment, the set of statistical analysis values 140 shown in FIG. 6 are computed for a continuous region between the lower and upper cursors 172, 174. This allows, for example, the statistical analysis to be performed over a continuous region that excludes a noisy region near the beginning or end of the welding process 10. The user optionally can also manually rescale the deposition rate graph 130 using suitable mouse and/or keyboard operations or the like. In one embodiment, "+" and "−" zoom buttons 184 allow the user to zoom the deposition rate graph 130 in or out, respectively, by fixed increments, such as ±2x zoom factor increments for each click of one of the zoom buttons 184. In another option, a double-click of the mouse within the deposition rate graph 130 causes the deposition rate at the position of the mouse pointer to be displayed. A second double-click causes the travel position at the position of the mouse pointer to be displayed.

To obtain a permanent record of the welding process 10, a "Save Report" button 188 is clicked by the user. This operation brings up a Windows save dialog or other suitable interfacing window through which the user identifies a logical file location and filename for saving the tandem welding parameters in a file. The stored data can include, for example, the measured welding parameters for each electrode 12, 14, 16, 18 as well as the tandem welding parameters computed therefrom, along with the values of user supplied inputs 120, 122, 124, 126. Although not shown in FIGS. 7 and 8, it is similarly contemplated to include a "Print" button which causes a suitable report to be printed on an attached printer, a network printer, or the like. User selection of a "Close" button 190 causes the analysis window to be closed.

The described analysis tools are examples only. Those skilled in the art can readily construct other tools. For example, a tandem welding input heat can be plotted in place of or in addition to the deposition rate graph 130. While tabs 132, 134 switch between the statistical and cursor values, it is contemplated to display both sets of parameters 140, 170 in a side-by-side, tiled, or other suitable display arrangement. Similarly, the graphs 90, 92, 94 of individual electrode measured parameters can be displayed side-by-side, tiled, or otherwise combined with the displays shown in FIGS. 7 and 8. The choice of visual layout of the analysis data and the amount of data simultaneously displayed is suitably determined based on considerations such as the size and resolution of the display or monitor 84. Moreover, a text-only display can be substituted for the described graphical display 84.

Still further, it is to be appreciated that the data storage medium 74 shown in FIG. 5 can be a temporary random access memory (RAM), a non-volatile magnetic disk storage, a temporary cache memory of a magnetic disk, a FLASH non-volatile solid-state memory, an optical disk, a combination of two or more of these storage media, or the like. While the processors 70, 110, and data storage medium 74, and the user interface 80 are shown in FIG. 5 as distinct components, it is to be appreciated that these components can be integrated in various ways. In one contemplated approach, the processors 70, 110 are embodied as software running on a computer that embodies the user interface 80, and the data storage medium 74 is a hard disk and/or RAM memory included in the computer or accessible by the computer over a local area network or the Internet. In another contemplated approach, the processors 70, 110, and data storage medium 74 are integrated into a welding power supply that operates the electrodes 12, 14, 16, 18, and the user interface 80 communicates with the welding power supply over a digital communication link.

The described embodiments employ tandem electrodes arranged linearly along an x-direction of travel. However, the analysis method and apparatus can apply to other configurations of a plurality of electrode that cooperate to form a weld. For example, the described analysis methods and apparatus can be applied to a parallel electrodes configuration in which a plurality of electrodes are arranged to simultaneously dispose weld beads at the same x-position along the x-direction of travel. This arrangement is accommodated by setting the "Distance from Lead" inputs 120 (shown in FIGS. 7 and 8) to zero for all the electrodes, since the parallel electrodes simultaneously deposit at the same position $x_0$.

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

Having thus described the preferred embodiments, the invention is now claimed to be:

1. A method for monitoring a tandem welding process employing a plurality of tandem electrodes, the method comprising:

measuring a welding parameter for each tandem electrode;

shifting the measured welding parameters to a reference; and combining the measured and shifted welding parameters of the tandem electrodes at the reference.

2. The method as set forth in claim 1, wherein the shifting comprises:

shifting a position coordinate of the measured welding parameter of each tandem electrode by a distance of the electrode from a reference position.

3. The method as set forth in claim 1, wherein the shifting comprises:

shifting a position coordinate of the measured welding parameter of each tandem electrode by a distance of the electrode from a reference electrode.

4. The method as set forth in claim 1, wherein the shifting comprises:

shifting a time coordinate of the measured welding parameter of each tandem electrode by a travel time during which the electrode travels to the reference position.

5. The method as set forth in claim 4, wherein the shifting of the time coordinate by a travel time comprises:

determining the travel time based on a travel speed of the plurality of tandem electrodes and a position of the electrode relative to a lead electrode of the plurality of tandem electrodes, the lead electrode position defining the reference position.

6. The method as set forth in claim 1, wherein the measuring of a welding parameter for each tandem electrode comprises:

computing at least one of a deposition rate welding parameter and a weld heat input welding parameter.

7. The method as set forth in claim 6, wherein the combining of the measured and shifted welding parameters comprises:

summing the computed and shifted deposition rates of the tandem electrodes to produce a tandem electrodes deposition rate at the reference; and summing the computed and shifted weld heat inputs of the tandem electrodes to produce a tandem electrodes weld heat input at the reference.

8. The method as set forth in claim 1, wherein the measuring of a welding parameter for each tandem electrode comprises:

measuring a welding parameter as a function of time for each electrode.

9. The method as set forth in claim 8, wherein the measuring of a welding parameter as a function of time comprises:

measuring the welding parameter at discrete times.

10. The method as set forth in claim 8, wherein the shifting comprises:

transforming the welding parameter as a function of time to a welding parameter as a function of position based on a position of a lead electrode of the plurality of tandem electrodes, a distance of the electrode from the lead electrode, and a travel speed of the plurality of tandem electrodes.

11. The method as set forth in claim 10, wherein the combining of the measured and shifted welding parameters comprises:

summing the welding parameters as a function of position to compute a welding parameter as a function of position for the plurality of tandem electrodes.

12. The method as set forth in claim 10, wherein the measuring of a welding parameter as a function of time for each electrode comprises:

measuring at least one of a deposition rate and a heat input.

13. A tandem welding system comprising:

a plurality of spaced apart electrodes arranged to travel at a common travel speed, the plurality of spaced apart electrodes cooperatively performing a weld;

a data storage medium storing measured data for each electrode during the performing of the weld; and a processor performing a process comprising:

for each electrode, recalling measured data corresponding to the electrode passing a reference position; and combining the recalled measured data of the plurality of spaced apart electrodes to compute a weld parameter of the tandem welding system at the reference position.

14. The tandem welding system as set forth in claim 13, wherein the electrodes are spaced apart linearly along a direction of travel, and the recalling of measured data corresponding to the electrode passing a reference position comprises:

dividing a distance of the electrode from a reference electrode of the plurality of spaced apart electrodes by the common travel speed to determine a time shift between measured data of the reference electrode and measured data of the electrode.

15. The tandem welding system as set forth in claim 14, wherein the recalling of measured data corresponding to the electrode passing a reference position further comprises:

determining a time at which the reference electrode passed the reference position by dividing a distance between the reference position and an initial position of the reference electrode by the common travel speed.

16. The tandem welding system as set forth in claim 14, wherein the recalling of measured data corresponding to the electrode passing a reference position further comprises:

determining a time at which the reference electrode passed the reference position based on a travel position of the plurality of spaced apart electrodes arranged to travel at a common travel speed.

17. The tandem welding system as set forth in claim 13, further comprising:

one or more voltage measuring devices measuring a voltage as a function of time associated with each of the plurality of spaced apart electrodes; and one or more current measuring devices measuring a current as a function of time associated with each of the plurality of spaced apart electrodes;

wherein the measured data stored in the data storage medium for each electrode includes at least the measured voltage and the measured current.

18. The tandem welding system as set forth in claim 17, wherein the measured data further includes a weld heat input for each electrode computed from the measured voltage and current, the combining of the recalled measured data of the plurality of spaced apart electrodes to compute a weld parameter of the tandem welding system at the reference position comprising:

summing the recalled weld heat input of each electrode to compute a tandem weld heat input parameter of the tandem welding system at the reference position.

19. The tandem welding system as set forth in claim 17, wherein the measured data further includes at least a weld heat input for each electrode, the weld heat input being computed based on at least the measured voltage and current.

20. The tandem welding system as set forth in claim 17, wherein the combining of the recalled measured data of the plurality of spaced apart electrodes to compute a weld parameter of the tandem welding system at the reference position comprises:

computing a weld heat input for each electrode from at least the recalled measured voltage and current for the electrode; and summing the weld heat input of the electrodes to compute a tandem weld heat input of the tandem welding system at the reference position.

21. The tandem welding system as set forth in claim 13, further comprising:

one or more wire feed speed controllers determining a wire feed speed associated with each of the plurality of spaced apart electrodes;

wherein the measured data stored in the data storage medium for each electrode includes at least the determined wire feed speed.

22. The tandem welding system as set forth in claim 21, wherein the measured data further includes a deposition rate for each electrode computed from at least the measured wire feed speed of the electrode, and the combining of the recalled measured data of the plurality of spaced apart electrodes to compute a weld parameter of the tandem welding system at the reference position comprises:

summing the recalled deposition rate of each electrode to compute a tandem deposition rate parameter of the tandem welding system at the reference position.

23. The tandem welding system as set forth in claim 21, wherein the measured data further includes at least a deposition rate as a function of time for each electrode, the deposition rate being computed based on at least the measured wire feed speed.

24. The tandem welding system as set forth in claim 21, wherein the combining of the recalled measured data of the plurality of spaced apart electrodes to compute a weld parameter of the tandem welding system at the reference position comprises:

computing a deposition rate for each electrode from the measured wire feed speed of the electrode; and summing the deposition rates of the electrodes to compute a tandem deposition rate of the tandem welding system at the reference position.

25. The tandem welding system as set forth in claim 13, wherein the processor performs the process for a plurality of different reference positions to produce the weld parameter of the tandem welding system as a function of position, and the tandem welding system further comprises:

a graphical user display providing a first window showing at least the weld parameter of the tandem welding system as a function of position.

26. The tandem welding system as set forth in claim 25, wherein the graphical user display provides a second window showing at least the measured data for each electrode as a function of position.

27. The tandem welding system as set forth in claim 26, wherein the graphical user display further providing a selector operable by an associated user to select between displaying the first and second windows.

28. The tandem welding system as set forth in claim 26, wherein the graphical user display provides the first and second windows displayed simultaneously.

29. The tandem welding system as set forth in claim 25, wherein the first window includes at least one user-manipulated cursor indicating the weld parameter at a position of the cursor.

30. The tandem welding system as set forth in claim 25, wherein the first window further includes at least two user-manipulated cursors and indicates a difference between the weld parameter values at the positions of the two cursors.

31. The tandem welding system as set forth in claim 13, further comprising:

a display showing at least the weld parameter of the tandem welding system at the reference position.

32. The tandem welding system as set forth in claim 13, wherein the spacing of nearest-neighboring electrodes is not the same for each pair of nearest-neighboring electrodes.

33. A tandem welding method comprising:

performing a tandem welding process using a plurality of electrodes arranged at fixed relative positions to one another and cooperatively forming a weld;

measuring a welding parameter of each of the plurality of electrodes during the welding process;

determining welding parameter values for each electrode that correspond to the electrode welding at a selected position; and computing a tandem welding parameter of the tandem welding process at the selected position based on the determined welding parameter values of the plurality of electrodes.

34. The tandem welding method as set forth in claim 33, wherein the measuring of a welding parameter of each of the plurality of electrodes comprises:

measuring at least one parameter associated with each electrode; and computing the welding parameter value for each electrode based on the measured at least one parameter associated with that electrode.

35. The tandem welding method as set forth in claim 33, wherein the measuring of a welding parameter of each of the plurality of electrodes comprises:

measuring at least a voltage, a current, and a wire feed speed associated with each electrode; and computing at least a deposition rate welding parameter value and a weld heat input welding parameter value for each electrode based on the measured at least one parameter associated with that electrode.

36. The tandem welding method as set forth in claim 35, wherein the computing of a tandem welding parameter of the tandem welding process at the selected position based on the determined welding parameter values of the plurality of electrodes comprises:

summing the deposition rate welding parameter values of the plurality of electrodes to compute a deposition rate tandem welding parameter; and summing the weld heat input welding parameter values of the plurality of electrodes to compute a weld heat input tandem welding parameter.

37. The tandem welding method as set forth in claim 33, wherein:

the measured welding parameter of each of the plurality of electrodes includes at least a voltage parameter, a current parameter, and a wire feed speed parameter; and the tandem welding parameter includes at least a deposition rate and a weld heat input.

38. The tandem welding method as set forth in claim 37, wherein the computing of a tandem welding parameter of the tandem welding process at the selected position based on the determined welding parameter values of the plurality of electrodes comprises:

computing deposition rate and weld heat input values for each electrode based on the determined voltage, current, and wire feed speed parameters of that electrode;

summing the deposition rate values of the plurality of electrodes to compute a deposition rate tandem welding parameter; and summing the weld heat input values of the plurality of electrodes to compute a weld heat input tandem welding parameter.

* * * * *